United States Patent [19]

Roe

[11] 4,308,827
[45] Jan. 5, 1982

[54] FUEL INJECTION SYSTEM FOR INTERNAL COMBUSTION ENGINES

[76] Inventor: Stephen E. Roe, R.R. 2, Roachdale, Ind. 46172

[21] Appl. No.: 86,298

[22] Filed: Oct. 19, 1979

[51] Int. Cl.³ .............................................. F02M 31/20
[52] U.S. Cl. ................................. 123/541; 261/50 A
[58] Field of Search ...................... 123/540, 541, 452; 261/50 A

[56] References Cited

U.S. PATENT DOCUMENTS

| | | | |
|---|---|---|---|
| 132,099 | 4/1911 | Petersen | 261/50 A |
| 876,287 | 1/1908 | Williams | 261/50 A |
| 1,022,702 | 4/1912 | Rothe | 261/50 A |
| 1,114,222 | 10/1914 | Brigham | 261/50 A |
| 1,354,327 | 9/1920 | Morden | 261/50 A |
| 3,593,694 | 7/1971 | Hilborn | 123/541 |

FOREIGN PATENT DOCUMENTS

| | | | |
|---|---|---|---|
| 81798 | 11/1920 | Austria | 261/50 A |
| 24544 | of 1910 | United Kingdom | 261/50 A |

*Primary Examiner*—Ronald H. Lazarus
*Attorney, Agent, or Firm*—Woodard, Weikart, Emhardt & Naughton

[57] ABSTRACT

A fuel injection system for internal combustion engines in which fuel is injected, under pressure, into an insulated fuel injection chamber wherein it mixes with incoming air and vaporizes. Heat absorbed in the evaporation of the fuel is taken primarily from the incoming air and from the incoming fuel in the fuel line, which is wrapped about the fuel injection chamber within the insulation, the resulting fuel-air mixture introduced into the combustion chamber is in both a super-cooled and a highly vaporized state.

5 Claims, 2 Drawing Figures

FUEL INJECTION SYSTEM FOR INTERNAL COMBUSTION ENGINES

BACKGROUND OF THE INVENTION

1. Field of the Invention

The field of the invention relates to systems which supply a fuel-air mixture into the combustion chamber(s) of an internal combustion engine.

2. Description of the Prior Art

For fuel efficiency, it is desirable to introduce a high amount of fuel-air charge into a cylinder for combustion. It is also desirable for fuel efficiency that a high proportion of the fuel introduced into the cylinder is evaporated rather than in liquid form.

Some systems of the prior art have been designed to introduce a high amount of fuel-air charge by incorporating various means of cooling the air or air-fuel mixture. A cooler fuel-air mixture results in a denser charge and thus more charge can be introduced. For instance, U.S. Pat. No. 4,155,337 to Hensly discloses a mechanical refrigeration system for cooling fuel prior to being inducted into the carburetor. Other systems have pre-cooled the air. by the introduction of this denser air into the combustion chamber a greater charge is provided and more oxygen is supplied so that there is more complete combustion.

Another system which cools the fuel-air mixture prior to introduction into a combustion chamber is disclosed by U.S. Pat. No. 4,165,720 to Barcak. According to this patent, a water jacket surrounds the intake manifold to cool the fuel-air mixture prior to entering into the combustion chamber, thus allowing a greater change to be introduced. U.S. Pat. No. 4,159,698 to Berenbaum discloses yet another system which incorporates a pre-cooling feature. According to the Berenbaum patent, an ordinary carburetion system is used in connection with an evaporation chamber. Fuel is vaporized in the evaporation chamber under a vacuum and the resulting cooled fuel-air mixture is introduced to the internal combustion engine downstream of the carburetor.

A typical problem with systems that involve cooling is that the fuel tends not to be fully vaporized, thus combustion is inhibited. It has been postulated that by heating the fuel-air mixture, a more completely vaporized fuel may be introduced into the combustion chambers of the engine. See U.S. Pat. No. 3,892,211 to Oyama, which discloses a system which both pre-heats, and then pre-cools the fuel air mixture prior to introduction into a combustion chamber.

SUMMARY OF THE INVENTION

In general terms, the present invention provides a fuel injection system for an internal combustion engine in which a super cooled fuel-air mixture is supplied to the combustion chamber(s) of the engine, and in which the cooling is accomplished by the evaporization of the injected fuel. In one embodiment, a fuel injection chamber has an injection port connecting with a combustion chamber, and an air-intake port which is throttle controlled. Fuel is supplied, under pressure, through a fuel line that is wrapped about the fuel injection chamber and into the fuel injection chamber wherein it mixes with the incoming air and vaporizes. The fuel injection chamber and fuel line are insulated together so that the heat absorbed from the evaporation of the fuel is taken primarily from the incoming air and from the fuel in the fuel line, thus resulting in a super-cooled and highly vaporized fuel-air mixture being introduced into the combustion chamber.

DESCRIPTION OF THE PREFERRED EMBODIMENT

Figure 1:
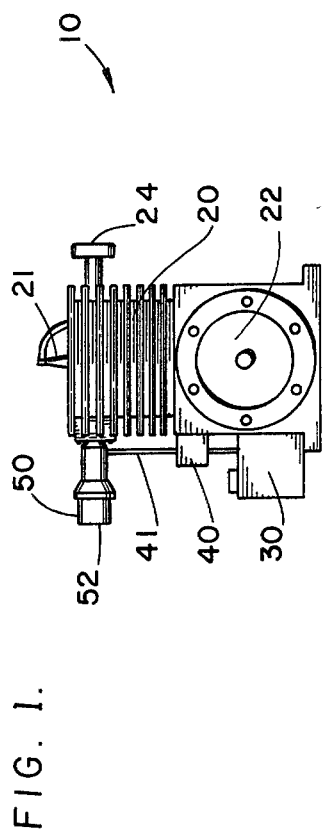
FIG. 1 is a front elevational view of a one cylinder engine incorporating a fuel injection system of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the drawings, FIG. 1 discloses a one cylinder engine 10 which incorporates the preferred embodiment of the present invention. One cylinder engine 10 includes a combustion chamber 20 having an intake port 23 (see FIG. 2) and an exhaust port 24. Combustion chamber 20 has a piston (not shown) which is cooperatingly mounted to crank case 22. Gas tank 30 contains a fuel supply and is connected to fuel pump 40 which supplies fuel, under pressure, through fuel line 41 to fuel injection chamber 50. Fuel injection chamber 50 has injection aperture 51 (see FIG. 2) which is connected to the intake port 23 of combustion chamber 20, and also has an air intake aperture 52. The flow of air through fuel injection chamber 50 is in the direction from air-intake aperture 52 and toward injection aperture 51.

Figure 2:
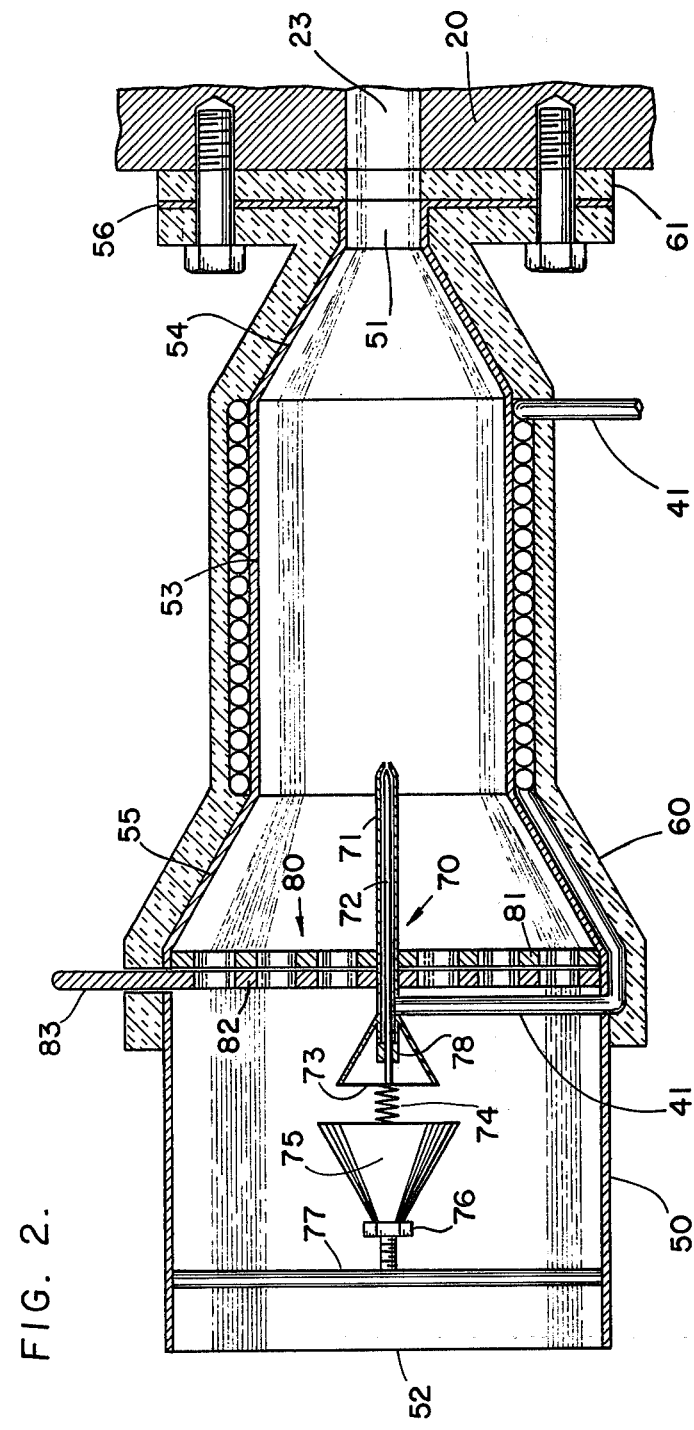
FIG. 2 is a longitudinally sectioned view of the fuel injection chamber as illustrated in FIG. 1.

In FIG. 2 it can be seen that fuel injection chamber 50 is surrounded by insulative material 60. Fuel line 41 is wrapped in a spiral configuration about fuel injection chamber 50, and is inside of insulative material 60. Fuel line 41 then enters fuel injection chamber 50 and leads to fuel injection apparatus 70. Fuel injection apparatus 70 includes nozzle 71, needle 72, pressure seal 78, pressure sensitive diaphragm 73, biasing spring 74, biasing mount 75, adjustable screw 76 and bar 77 which is mounted to fuel injection chamber 50. Nozzle 71 is mounted to throttle plate 81 of throttle apparatus 80. Needle 72 is mounted to diaphragm 73 and is slidable within nozzle 71 to vary the opening at the tip of nozzle 71. The sensitivity of diaphragm 73 is adjustable by adjusting adjustable screw 76 which controls the position of biasing mount 75 and biasing spring 74.

Throttle apparatus 80 includes, in addition to throttle plate 81, throttle plate 82 and throttle control 83. A number of holes have been drilled in the same pattern in both throttle plates 81 and 82, which are transversely mounted within fuel injection chamber 50. Throttle control 83 has the capability of adjusting throttle plate 82 by rotating it such that the holes in throttle plates 81 and 82 are aligned to varying degrees. Thus the amount of air flowing through fuel injection chamber 50 can be controlled by selecting the total area of passage through plates 81 and 82.

Fuel injection chamber 50 has a cylindrical portion 53 about which fuel line 41 is wrapped. Fuel injection chamber 50 also has two frustoconically shaped portions 54 and 55, each frustoconical portion extending inwardly as it extends toward the intake port 23 of combustion chamber 20. Frustoconical portion 54 is that portion of the fuel injection chamber 50 which extends between cylindrical portion 53 and injecting aperture 51. Frustoconical portion 55 is that portion of fuel injection chamber 50 which extends between throttle apparatus 80 and cylindrical portion 53.

Fuel injection chamber 50 is mounted to combustion chamber 20 by mounting plate 56 which is bolted to combustion chamber 20. Between mounting plate 56 and combustion chamber 20 is insultative material 61. Insulative material 61 insulates fuel injection chamber 50 from the heat of combustion in combustion chamber 20.

The preferred embodiment may be viewed as a type of hybrid between a carburetor system and a fuel injection system. It has characteristics of a fuel injection system in that it has a high pressure fuel injector. However because of the throttle plate, it has certain similarities with carburetor systems.

When fuel is injected, under pressure, at nozzle 71, it sprays into fuel injection chamber 50 and mixes with the incoming air. The fact that the fuel is being sprayed under pressure aids in the vaporization of the fuel. Because of the insulation material 60 and 61, the heat absorbed by the vaporization of the fuel is taken primarily from the incoming air and from the fuel in fuel line 41. The cooling of fuel in fuel line 41 causes the injected fuel to be cooler than the incoming air, thus allowing it to absorb heat from the air in the evaporization process and providing for more complete evaporization. The result is a highly vaporized, super cooled fuel-air mixture that is taken into the combustion chamber.

The timing of injection of fuel nozzle 71 is controlled by fuel injection apparatus 70. Diaphragm 73 is sensitive to changes in pressure. When a decrease in pressure occurs, indicating the air is being taken into combustion chamber 20 through intake port 23 owing to the vacuum created in combustion chamber 20 during its intake cycle, diaphragm 73 causes needle 72 to be drawn away from the tip of nozzle 71 to enlarge the opening at nozzle 71, thus allowing fuel to be injected at nozzle 71 under pressure. The injection of fuel by nozzle 71, since it is controlled by pressure sensitive diaphragm 73, can be adjusted by adjusting the adjustable screw 76 which adjusts the position of biasing mount 75 which is in turn attached to pressure sensitive diaphragm 73 by biasing spring 74. Pressure seal 78 prevents the leakage of fuel and also maintains the positioning of needle 72.

The generally conical shape of biasing mount 75 aids the sensitivity of pressure sensitive diaphragm 73, as it causes there to be more decreased pressure at diaphragm 73 when air is being drawn through fuel injection chamber 50, while being a minimal restriction to air flow. Nozzle 71 is mounted to throttle plate 81 in this manner also to provide for the minimal restriction of air flow. Because the injection of fuel into fuel injection chamber is controlled by the drawing of air through fuel injection chamber 50, a constant fuel-air ratio is assured.

Throttle apparatus 80 consists of two drilled throttle plates 81 and 82 to provide the smooth flow of air without forming vacuum areas, thereby making the fuel injection more effective. The intake of air is controlled by throttle control 83 which rotates throttle plate 82 with respect to throttle plate 81, thereby limiting the overall amount of air which may be taken into combustion chamber 20.

The actual dimensions of fuel injection chamber 50 and of the related apparatus should be chosen depending upon the particular application. Fuel injection chamber 50 should be large enough so that it does not choke the vacuum drawing air into the combustion chamber 20. Fuel injection chamber 50 should also be small enough so that the vacuum drawing air into combustion chamber 20 can be sensed by pressure sensitive diaphragm 73. Also, fuel injection chamber should be long enough so that the evaporation process can be completed within fuel injection chamber 50. The frustoconically shaped portions 54 and 55 add to the super charging effect of the fuel-air mixture.

The present invention may be used with a variety of fuel application is by varying the applied fuel pressure so that the particular fuel will evaporate. Varying the fuel pressure may also prevent frosting which may tend to occur at the tip of nozzle 71 in some applications. This frosting problem may also be prevented by supplying a small amount of heat to the tip of nozzle 71, such as by a small electrical resistance wire.

Because the fuel-air mixture introduced into the combustion chamber is in a condensed, super-cooled, and highly vaporized state, it readily combusts and absorbs heat during the combustion cycle to provide for efficient operation of the engine. For multi-cylinder engines, fuel injection chambers such as that hereinabove described may be used for each individual combustion chamber and the injection may be timed in the same manner. For a multi-cylinder internal combustion engine, a common manifold could also be used which directs the incoming fuel-air mixture into the different cylinders. In this type of system the air flow and fuel injection into the fuel injection chamber would be virtually constant, and therefore timing would be unnecessary.

While there have been described above the prinicples of this invention in connection with specific apparatus and techniques, it is to be clearly understood that this description is made only by way of an example and not as a limitation to the scope of the claims.

What is claimed is:

1. An internal combustion engine having at least one combustion chamber and means for supplying a fuel air mixture into the combustion chamber, said means for supplying a fuel-air mixture comprising:
   (a) a fuel injection chamber defining an injection aperture connected with a combustion chamber of said internal combustion engine, said fuel injection chamber further defining an air-intake aperture;
   (b) fuel pump means for supplying fuel under pressure;
   (c) fuel injector means for controlling the injection of fuel into said fuel injection chamber,
   said fuel injector means includes:
   (1) a nozzle mounted within said fuel injection chamber, said nozzle being connected to said fuel line;
   (2) a pressure sensitive device, said pressure sensitive device being mounted within said fuel injection chamber upstream of said throttle means and including a pressure sensitive diaphragm;

(3) a needle, said needle being movably mounted within said nozzle between positions in which said needle closes and opens said nozzle; and (4) linkage means for translating movement of said pressure sensitive diaphragm to said needle in which a decrease in pressure sensed by said pressure sensitive device is translated to a movement by said needle tending to open said nozzle;

(d) a fuel line connecting said fuel pump means with said fuel injector means;

(e) throttle means for limiting air flow into the air-intake aperture of said fuel injection chamber, said throttle means being located upstream of the injection of fuel by said fuel injector means into said fuel injection chamber;

(f) air-fuel mixture cooling means for causing heat absorbed by evaporation of fuel within said fuel injection chamber to be primarily taken from the air entering said fuel injection chamber, said air-fuel mixture cooling means including insulation surrounding said fuel injection chamber; and (g) evaporation aid means for causing fuel injected by said fuel injector means to be cooler than the air entering said fuel injection chamber, said evaporation aid means including a portion of said fuel line being wrapped about said fuel injection chamber and within said insulation and downstream of said throttle and fuel injector means.

2. The improved internal combustion engine of claim 1 in which said throttle means includes a first and a second drilled plate, said plates being mounted adjacent to each other within said fuel injection chamber and transverse to the direction of air flow within said fuel injection chamber, one of said plates being rotatable with respect to the other of said plates such that the total area of passage through both of said plates varies.

3. The improved internal combustion engine of claim 1 in which said fuel injection chamber has a cylindrical portion, and the portion of said fuel line which is wrapped about said fuel injection chamber is wrapped in a spiral configuration about said cylindrical portion.

4. The improved internal combustion engine of claim 3 in which said fuel injection chamber additionally includes a frustoconical portion extending between said cylindrical portion and the injection chamber, said frustoconical portion extending inwardly as it extends toward the aperture.

5. The improved internal combustion engine of claim 4 in which said fuel injection chamber additionally includes a second frustoconical portion, said second frustoconical portion extending between said cylindrical portion and said throttle means, said second frustoconical portion extending inwardly as it extends toward said cylindrical portion.

* * * * *